US010208217B2

(12) United States Patent
Takahashi et al.

(10) Patent No.: US 10,208,217 B2
(45) Date of Patent: Feb. 19, 2019

(54) AQUEOUS INK FOR INKJET AND PRINTING METHOD

(71) Applicants: TOYO INK SC HOLDINGS CO., LTD., Chuo-ku (JP); TOYO INK CO., LTD., Chuo-ku (JP)

(72) Inventors: Yukitoshi Takahashi, Tokyo (JP); Masahiro Sugihara, Tokyo (JP)

(73) Assignees: TOYO INK SC HOLDINGS CO., LTD., Chuo-ku (JP); TOYO INK CO., LTD., Chuo-ku (JP)

( * ) Notice: Subject to any disclaimer, the term of this patent is extended or adjusted under 35 U.S.C. 154(b) by 0 days.

(21) Appl. No.: 14/783,931

(22) PCT Filed: Apr. 11, 2014

(86) PCT No.: PCT/JP2014/060511
§ 371 (c)(1),
(2) Date: Oct. 12, 2015

(87) PCT Pub. No.: WO2014/168240
PCT Pub. Date: Oct. 16, 2014

(65) Prior Publication Data
US 2016/0046816 A1    Feb. 18, 2016

(30) Foreign Application Priority Data
Apr. 12, 2013  (JP) .................. 2013-083742

(51) Int. Cl.
| C09D 11/30 | (2014.01) |
| C09D 11/36 | (2014.01) |
| C09D 11/107 | (2014.01) |
| C09D 11/326 | (2014.01) |
| C09D 11/40 | (2014.01) |

(52) U.S. Cl.
CPC ............ *C09D 11/30* (2013.01); *C09D 11/107* (2013.01); *C09D 11/326* (2013.01); *C09D 11/36* (2013.01); *C09D 11/40* (2013.01)

(58) Field of Classification Search
CPC ....... C09D 11/322; C09D 11/40; C09D 11/30; C09D 11/326; C09D 11/03; B41J 2/2107
See application file for complete search history.

(56) References Cited

U.S. PATENT DOCUMENTS

| 5,069,718 A * | 12/1991 | Kappele | ............... C09D 11/328 106/31.32 |
| 6,451,098 B1 * | 9/2002 | Lye | .................. C09D 11/32 106/31.47 |
| 2003/0097960 A1 | 5/2003 | Ito et al. | |
| 2005/0075449 A1 | 4/2005 | Kubota | |
| 2007/0040882 A1 * | 2/2007 | Kanaya | .................. B41J 2/2107 347/100 |
| 2007/0263054 A1 | 11/2007 | Yatake et al. | |
| 2008/0276833 A1 | 11/2008 | Sasaki et al. | |
| 2009/0181219 A1 * | 7/2009 | Saito | .................... C09D 11/322 428/195.1 |
| 2009/0234065 A1 * | 9/2009 | Sasada | ................... C09D 11/40 524/558 |
| 2009/0258147 A1 * | 10/2009 | Saito | ................... B41M 5/0023 427/256 |
| 2009/0258198 A1 * | 10/2009 | Koganehira | ......... C09D 11/322 428/195.1 |
| 2011/0069118 A1 * | 3/2011 | Ohzeki | ................ B41J 2/14233 347/44 |
| 2011/0192317 A1 | 8/2011 | Koganehira | |
| 2011/0216122 A1 * | 9/2011 | Maruyama | ............... B41J 2/015 347/20 |
| 2011/0217468 A1 * | 9/2011 | Maruyama | ............... B05D 5/00 427/256 |
| 2012/0069084 A1 * | 3/2012 | Yasuda | ................ C09D 11/101 347/21 |
| 2013/0065028 A1 * | 3/2013 | Fujii | ..................... C09D 7/001 428/195.1 |

FOREIGN PATENT DOCUMENTS

| CN | 102827511 A | 12/2012 |
| JP | 2008 247941 | 10/2008 |
| JP | 2008 303380 | 12/2008 |
| JP | 2009 197166 | 9/2009 |

(Continued)

OTHER PUBLICATIONS

International Preliminary Report on Patentability and Written Opinion dated Oct. 22, 2015 in PCT/JP2014/060511 filed Apr. 11, 2014 (submitting English translation only).
International Search Report dated Jun. 10, 2014 in PCT/JP14/060511 Filed Apr. 11, 2014.
Japanese Office Action dated Dec. 17, 2013 in a corresponding JP Application No. JP2013 083742 Filed Apr. 12, 2013.
Combined Chinese Office Action and Search Report dated May 17, 2016 in Patent Application No. 201480020602.1 (with English Translation).
European Search Report dated Sep. 8, 2016, in corresponding Patent Application No. EP 14783288.5.
Office Action dated Sep. 28, 2017, in corresponding European Patent Application No. 14783288.5 (with English-language Translation).
Office Action dated May 4, 2018 in European Patent Application No. 14783288.5, 6 pages.

*Primary Examiner* — John P Zimmermann
(74) *Attorney, Agent, or Firm* — Oblon, McClelland, Maier & Neustadt, L.L.P.

(57) ABSTRACT

To provide an aqueous ink for inkjet which has superior printability to typical printing media, particularly media having high glossiness, such as coated paper, art paper, and vinyl chloride sheets, and which is capable of forming a high quality image by printing. An aqueous ink for inkjet, comprising a pigment, a pigment dispersing resin, an organic solvent, and water, wherein: the organic solvent contains (A) a water-soluble organic solvent having a boiling point of 100° C. or higher and 180° C. or lower, and (B) an organic solvent having a boiling point of 200° C. or higher and 280° C. or lower, and having a surface tension of 20 mN/m or more and 30 mN/m or less.

25 Claims, No Drawings

(56) References Cited

FOREIGN PATENT DOCUMENTS

| JP | 2010 18741 | 1/2010 |
|----|------------|--------|
| JP | 4595281 | 12/2010 |
| JP | 2011 178980 | 9/2011 |
| JP | 4764562 | 9/2011 |
| JP | 2012 77118 | 4/2012 |
| JP | 2013 27979 | 2/2013 |
| JP | 2013-216864 | 10/2013 |

* cited by examiner

AQUEOUS INK FOR INKJET AND PRINTING METHOD

TECHNICAL FIELD

The present invention relates to an aqueous ink for inkjet which has superior printability to typical printing media, particularly media having high glossiness, such as coated paper, art paper, and vinyl chloride sheets, and which is capable of forming a high quality image by printing. In addition, the present invention relates to a printing method using the aqueous ink for inkjet.

BACKGROUND ART

Inkjet recording method is a printing method of forming characters and images on recording media by ejecting ink droplets from very fine nozzles directly to the recording media, and attaching the ink thereto. The apparatus used in the above-described recording system has advantages that it makes low noise, and is easy to handle. In addition, there are other advantages that colorization of this recording system is easy, and plain paper can be used as the recording medium (hereinafter referred to as printing medium). Therefore, apparatuses on this recording system are widely used as output machines in offices and homes.

Meanwhile, for the industrial use, with the improvement of inkjet technology, the use as a digital printing output apparatus is expected. Actually, printing machines using solvent inks and UV inks which can print on plain paper and unabsorbent media (for example, plastic base materials such as PVC and PET) are commercially available. However, in recent years, from the viewpoint of ecological friendliness, demands for aqueous inks are increasing.

For aqueous inks for inkjet, as seen in Patent Literatures 1, 2, and 3, inks used for printing on paper media including plain paper and exclusive paper such as photographic glossy paper have been developed for a log time. Meanwhile, in recent years, applications of printing of the inkjet recording system are expected to expand, and there is an increasing demand for direct printing on low water absorbing printing media such as coated paper and unabsorbent base materials used for, for example, outdoor advertisement. Conventional aqueous inks are assumed to be used for drawing carried out by making the ink droplets absorbed in a paper medium, therefore the suitable printing media are limited. When a conventional aqueous ink is used for printing on a printing medium with low water absorbency, image bleeding occurs, therefore improvement is desired.

In response to this, Patent Literature 4 discloses that direct printing can be carried out without causing bleeding on coated paper by using an ink composition containing a crystalline glycitol. This ink composition decreases ink flowability and prevents image bleeding through the crystallization of the crystalline glycitol after printing. However, when this ink composition is used, if the crystalline glycitol remains in the coating film, the crystalline glycitol dissolves when, for example, fouling is wiped from the printed material with an alcohol solvent or detergent, which can cause problems such as deterioration of the coating film.

CITATION LIST

Patent Literatures

Patent Literature 1: JP 4764562 B2
Patent Literature 2: JP 4595281 B2
Patent Literature 3: JP 2008-247941 A
Patent Literature 4: JP 2011-178980 A

SUMMARY OF INVENTION

Technical Problem

In view of the above-described circumstances, the present invention is intended to provide an aqueous ink for inkjet which has superior printability to typical printing media, particularly media having high glossiness, such as coated paper, art paper, and vinyl chloride sheets, and which is capable of forming a high quality image by printing. In addition, the present invention is intended to provide a printing method of the inkjet recording system using the aqueous ink for inkjet.

Solution to Problem

A first aspect of the present invention relates to an aqueous ink for inkjet containing a pigment, a pigment dispersing resin, an organic solvent, and water, wherein the organic solvent contains a water-soluble organic solvent (A) having a boiling point of 100° C. or higher and 180° C. or lower, and an organic solvent (B) having a boiling point of 200° C. or higher and 280° C. or lower and having a surface tension of 20 mN/m or more and 30 mN/m or less, and the pigment dispersing resin has an alkyl group with a carbon atom number of 8 or more.

The total content of the water-soluble organic solvent (A) and the organic solvent (B) is preferably from 10 to 45% by weight with reference to the total weight of the ink.

The pigment dispersing resin preferably contains an acrylic resin having an alkyl chain with a carbon atom number of 10 or more.

The water-soluble organic solvent (A) preferably contains at least one selected from the group consisting of propylene glycol monomethyl ether, methoxybutanol, and 3-methyl-3-methoxybutanol.

The organic solvent (B) preferably contains an alkane-diol-type solvent.

The aqueous ink preferably further contains a surfactant, and the surfactant preferably contains a polysiloxane-type surfactant.

A second aspect of the present invention relates to a printing method of the inkjet recording system using the aqueous ink for inkjet of the first aspect, that the printing method includes a printing step wherein droplets of the aqueous ink are deposited on the printing medium under warming. Here, a 60° glossiness of the printing medium is preferably 40 or more.

Advantageous Effects of Invention

According to the present invention, it allows providing an ink composition for inkjet which has superior printability to typical printing media, particularly media having high glossiness, such as coated paper, art paper, and vinyl chloride sheets, and which is capable of forming a high quality image.

Disclosure of the present invention relates to the subject of Japanese Patent Application No. 2013-083742 filed on Apr. 12, 2013, and the disclosure of which is incorporated by reference herein.

DESCRIPTION OF EMBODIMENTS

Details about the present invention are described below based on preferred embodiments.

<Ink for Inkjet>

The aqueous ink for inkjet of the present invention is an aqueous ink composition which can be used suitably for performing printing to typical printing media according to the inkjet recording system. The aqueous ink (hereinafter may be referred to simply as "ink") contains a pigment, a pigment dispersing resin, an organic solvent, and water, wherein the organic solvent is composed of two or more specific organic solvents, and the pigment dispersing resin has an alkyl group with a carbon atom number of 8 or more. The organic solvent is specifically composed of at least a water-soluble organic solvent (A) having a boiling point of 100° C. or higher and 180° C. or lower, and an organic solvent (B) having a boiling point of 200° C. or higher and 280° C. or lower, and having a surface tension of 20 mN/m or more and 30 mN/m or less. The major components of the ink are specifically described below.

(Pigment Dispersing Resin)

In the present invention, during preparation of the ink, the pigment is dispersed using a pigment dispersing resin, thereby increasing dispersion stability, and preventing pigment aggregation during drying of the ink. If pigment flocculation occurs, broadening of dots is inhibited, and white voids occur, whereby printing quality tends to deteriorate. In addition, asperities are formed on the surface of the printed material because of insufficient broadening of dots, whereby glossiness tends to decrease. Therefore, the pigment dispersing resin useful in the present invention is not particularly limited, but is preferably selected from those in order to impart various superior properties to the ink.

Examples of the pigment dispersing resin useful in the present invention include acrylic resins, maleic acid resins, styrene maleic acid resins, and α-olefin maleic acid resins, urethane resins, and ester resins. The resin may be used singly or in combination of two or more thereof. Among them, in one embodiment of the present invention, the pigment dispersing resin preferably contains an acrylic resin.

The "acrylic resin" described herein means a polymer containing a structural unit obtained by polymerizing a (meth)acrylic acid and/or a (meth)acrylate. In one embodiment, the "acrylic resin" may be a polymer having a structural unit obtained by polymerizing a (meth)acrylate having an alkyl group with a carbon atom number of 1 or more. In this embodiment, the polymer preferably has an alkyl group with a carbon atom number of 8 or more, and more preferably has an alkyl chain with a carbon atom number of 10 or more. The polymer may be a homopolymer of a (meth)acrylate an alkyl group with a carbon atom number of 8 or more, or a copolymer composed of the ester and other polymerizable monomer compound such as (meth)acrylic acid. In either embodiment, the polymer having an alkyl group with a carbon atom number of 8 or more easily improves dispersion stability of the ink. In addition, the improved dispersion stability also further improves printing quality and glossiness. Accordingly, in one embodiment, the pigment dispersing resin preferably has an alkyl group with a carbon atom number of 8 or more.

The alkyl group with a carbon atom number of 8 or more may be linear or branched. Specific examples of the alkyl group include an octyl group (C8), a 2-ethylhexyl group (C8), a nonyl group (C9), a decyl group (C10), a lauryl group (C12), a myristyl group (C14), a cetyl group (C16), a stearyl group (C18), arachidyl group (C20), behenyl group (C22), lignoceryl group (C24), cerotoyl group (C26), montanyl group (C28), myricyl group (C30), dotriacontanoyl group (C32), tetratriacontanoyl group (C34), and hexatriacontanoyl group (C36). Among them, linear alkyl groups are preferred, and linear alkyl groups with a carbon atom number of 10 or more are more preferred. When the polymer used as a pigment dispersing resin has an alkyl group with a carbon atom number of 8 or more, printing quality and glossiness of the printed material are easily improved. In addition, when the polymer has an alkyl group with a carbon atom number of 10 or more, these properties are further improved. On the other hand, if the alkyl group in the polymer is too long, ejection stability of the ink may deteriorate. Therefore, the alkyl group preferably has a carbon atom number of 12 to 30, and more preferably has a carbon atom number of 18 to 24.

In one embodiment, the acid value of the pigment dispersing resin is preferably from 50 to 400 mgKOH/g. If the acid value is less than 50 mgKOH/g, the pigment dispersing resin is poorly dissolved in water, so that the ink has a high viscosity, and ejection may be influenced. In addition, if the acid value is more than 400 mgKOH/g, interaction in the resin increases, so that the viscosity of the ink may increase. From this viewpoint of, in one embodiment, the acid value of the pigment dispersing resin is more preferably from 100 to 350 mgKOH/g, and even more preferably from 150 to 300 mgKOH/g.

In one embodiment, the weight average molecular weight of the pigment dispersing resin is preferably from 5,000 to 100,000. When the molecular weight is 5,000 or more, superior dispersion stability is readily achieved. When the molecular weight is 100,000 or less, influence on ejection is readily prevented. In one embodiment, the molecular weight of the pigment dispersing resin is more preferably from 10,000 to 50,000, and even more preferably from 15,000 to 30,000.

In another embodiment, the pigment dispersing resin preferably has an aromatic group. The introduction of the aromatic group to the polymer makes it easy to increase pigment dispersibility and improve dispersion stability. Examples of the aromatic group include a phenyl group, a naphthyl group, an anthryl group, a tolyl group, a xylyl group, a mesityl group, and an anisyl group. Among them, the aromatic group is preferably a phenyl group or a tolyl group. In a more specific embodiment, the pigment dispersing resin is preferably an acrylic resin having an aromatic group, and is described as "styrene acrylic resin" herein. The term "styrene acrylic resin" means a polymer containing a structural unit obtained by polymerizing styrene and/or a styrene derivative, and (meth)acrylic acid and/or a (meth)acrylate. Examples of the styrene derivative include methylstyrene and vinylnaphthalene. The alkyl group in the (meth)acrylate is as explained above.

In a preferred embodiment of the present invention, the pigment dispersing resin is, but not limited to, a copolymer obtained by polymerizing (i) (meth)acrylic acid, (ii) a (meth)acrylate having an alkyl group with a carbon atom number of 8 or more, and as necessary, (iii) a polymerizable monomer compound having an aromatic group. In one embodiment, the contents of the monomer components composing the copolymer are: (i) from 10 to 50% by weight, preferably from 20 to 40% by weight, (ii) from 10 to 70% by weight, preferably from 20 to 50% by weight, and (iii) from 0 to 50% by weight, preferably from 10 to 40% by weight, with reference to the total weight of all the monomer components.

In one embodiment, in the pigment dispersing resin used in the present invention, the acid group in the dispersing resin is preferably neutralized with a base, thereby improving solubility in water. Examples of the base include organic bases such as ammonia water, dimethylamino ethanol, diethanolamine, and triethanolamine, and inorganic bases such as lithium hydroxide, sodium hydroxide, and potassium hydroxide. Among them, the embodiment using an organic base is preferred, because the base is volatilized during ink drying, whereby water resistance of the printed material tends to be improved.

In the ink composition of the present invention, the weight ratio of the pigment to the pigment dispersing resin (pigment/pigment dispersing resin) is preferably from 2/1 to 100/1. When the weight ratio is less than 2/1, the increase of the ink viscosity is readily prevented. In addition, when the weight ratio is 100/1 or more, good dispersibility and stability are readily achieved. The weight ratio of the pigment to the pigment dispersing resin is more preferably from 4/1 to 50/1, even more preferably from 5/1 to 25/1, and most preferably from 10/1 to 20/1.

(Organic Solvent)

In the present invention, at least two specific organic solvents are used in combination. The first solvent is a water-soluble organic solvent (A) having a boiling point of 100° C. or higher and 180° C. or lower (hereinafter referred to as "solvent A"). The second solvent is an organic solvent (B) having a boiling point of 200° C. or higher and 280° C. or lower, and having a surface tension of 20 mN/m or more and 30 mN/m or less (hereinafter referred to as "solvent B"). In the present invention, desired properties such as drying characteristics, printing quality, and glossiness are achieved at high levels by combining, at least, the two specific solvents A and B. Although not limited by theory, this principle is considered as follows. Firstly, the use of the low-boiling solvent A hastens drying after landing of the ink droplets on the printing medium. During the drying, the solvent A and water in the ink vaporize, and the solvent B with a high boiling point remains in the ink droplets. The solvent B spreads on the printing medium due to its low surface tension, a uniform coating film is formed in the solid printed area, and a printed material with high glossiness is formed. Even if the concentration of the solvent B in the ink droplets is increased, the pigment dispersing resin prevents pigment flocculation, so that a uniform coating film is likely formed. In addition, the solvent A and water in the ink immediately dry, so that the viscosity of the ink droplets increases, and color mixing hardly occurs even when the ink is brought into contact with other color ink. In contrast, when the ink is free from the solvent A and slow at drying, the viscosity is very low even after landing of the ink on the printing medium, so that the ink readily mixes with other color ink, and bleeding readily occurs, so that printing quality can deteriorate.

The total content of the solvents A and B in the ink is preferably from 10 to 45% by weight, with reference to the total weight of the ink. If the total content is too low, drying characteristics and wettability for printing media are poor, and printing quality may deteriorate on some printing media. In addition, if the total content is more than 45% by weight, storage stability of the ink may deteriorate. In one embodiment, the total content of the solvents A and B is more preferably from 15 to 30% by weight, even more preferably from 18 to 28% by weight, and most preferably from 20 to 26% by weight, with reference to the total weight of the ink. In addition, the content of each of the solvents A and B is preferably from 5 to 25% by weight, more preferably from 8 to 20% by weight, and even more preferably from 10 to 15% by weight.

The content ratio (weight ratio) of the solvents A and B is preferably solvent A:solvent B=1:5 to 5:1, more preferably solvent A:solvent B=1:4 to 4:1, even more preferably solvent A:solvent B=1:3 to 2:1, and most preferably solvent A:solvent B=1:2 to 2:1.

The solvent A may be any water-soluble organic solvent having a boiling point of 100° C. or higher and 180° C. or lower. Examples of the solvent A include, but not limited to, ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, methoxybutanol, 3-methyl-3-methoxybutanol, diethylene glyco-dimethyl ether, diethylene glycol methyl ethyl ether, diethylene glycol methyl ether acetate, and ethyl lactate. Among them, at least one selected from the group consisting of propylene glycol monomethyl ether, propylene glycol monoethyl ether, propylene glycol monopropyl ether, methoxybutanol, and 3-methyl-3-methoxybutanol is preferred, from the viewpoint of drying characteristics and printing quality. More preferred is at least one selected from the group consisting of propylene glycol monomethyl ether, methoxybutanol, and 3-methyl-3-methoxybutanol. Even more preferred are propylene glycol monomethyl ether and/or methoxybutanol. Most preferred is propylene glycol monomethyl ether.

The solvent B may be any organic solvent having a boiling point of 200° C. or higher and 280° C. or lower, and having a surface tension of 20 mN/m or more and 30 mN/m or less. The term "surface tension" means a value measured by the Wilhelmy method (plate method, vertical plate method) at 25° C. Specifically, the surface tension can be measured using an apparatus such as a high precision surface tensiometer DY-700 (manufactured by Kyowa Interface Science Co., Ltd.). Examples of the solvent B include, but not limited to, 1,2-pentanediol, 1,2-hexanediol, 1,2-octanediol, ethylene glycol monohexyl ether, ethylene glycol-2-ethylhexyl ether, diethylene glycol monobutyl ether, diethylene glycol monohexyl ether, diethylene glycol-2-ethylhexyl ether, triethylene glycol monobutyl ether, dipropylene glycol monopropyl ether, dipropylene glycol monobutyl ether, tripropylene glycol monomethyl ether, tripropylene glycol monobutyl ether, diethylene glycol methylbutyl ether, triethylene glycol methylbutyl ether, and tripropylene glycol dimethyl ether. Among them, preferred are alkanediol-type solvents, and/or glycol ether-type solvents having a terminal carbon chain with a carbon atom number of 3 or more. More preferred are alkanediol-type solvents, and even more preferred is 1,2-hexanediol.

In one embodiment of the present invention, the organic solvent in the ink may further include, in addition to the two solvents A and B, another solvent for adjusting the viscosity, or improving ejection properties. Examples of the another solvent include glycerol, both terminal diol, 2-pyrrolidone, N-methyl pyrrolidone, N-ethyl pyrrolidone, N-methyl oxazolidinone, N-ethyl oxazolidinone, γ-butyrolactone, ε-caprolactone, and N,N-dimethyl-β-methoxypropionamide.

(Pigment)

Examples of the pigment useful in the present invention are listed below. These pigment examples may be used singly, or in combination of two or more thereof. The content of the pigment is from 0.1 to 20% by weight, preferably from 1 to 10% by weight, and more preferably from 2 to 7% by weight, with reference to the total weight of the ink.

In the present invention, the pigment may be an inorganic or organic pigment. Examples of the inorganic pigment include titanium oxide, zinc oxide, zinc sulfide, white lead, calcium carbonate, sinking properties barium sulfate, white carbon, alumina white, kaolin clay, talc, bentonite, black iron oxide, cadmium red, red oxide, molybdenum red, molybdate orange, chromium vermilion, chrome yellow, cadmium yellow, yellow iron oxide, titanium yellow, chromic oxide, viridian, titanium cobalt green, cobalt green, cobalt chrome green, victoria green, ultramarine blue, Berlin blue, cobalt blue, cerulean blue, cobalt silica blue, cobalt zinc silica blue, manganese violet, and cobalt violet.

Examples of the organic pigment include azo pigments, phthalocyanine pigments, anthraquinone pigments, quinacridone pigments, isoindolinone pigments, quinophthalone pigments, dye lake pigments, and fluorescent pigments.

More specific examples of the cyan pigment include C. I. Pigment Blue 1, 2, 3, 15:1, 15:3, 15:4, 15:6, 16, 21, 22, 60, and 64.

Examples of the magenta pigment include C. I. Pigment Red 5, 7, 9, 12, 31, 48, 49, 52, 53, 57, 97, 112, 120, 122, 146, 147, 149, 150, 168, 170, 177, 178, 179, 184, 188, 202, 206, 207, 209, 238, 242, 254, 255, 264, 269, 282; C. I. Pigment Violet 19, 23, 29, 30, 32, 36, 37, 38, 40, and 50.

Examples of the yellow pigment include C. I. Pigment Yellow 1, 2, 3, 12, 13, 14, 16, 17, 20, 24, 74, 83, 86, 93, 94, 95, 109, 110, 117, 120, 125, 128, 129, 137, 138, 139, 147, 148, 150, 151, 154, 155, 166, 168, 180, 185, and 213.

Examples of the black pigment include carbon black manufactured by furnace method or channel method. In one embodiment, the carbon black preferably has a primary particle size of from 11 to 40 nm, and has a specific surface area of from 50 to 400 m$^2$/g as measured by the BET method, and has a volatile content of from 0.5 to 10%, and further has a pH value of from 2 to 10. The carbon black having these properties is commercially available. Example include No. 33, 40, 45, 52, 900, 2200B, 2300, MA7, MA8, MCF88 (manufactured by Mitsubishi Chemical Corporation); RAVEN 1255 (manufactured by Columbian Carbon Co.); REGA330R, 400R, 660R, MOGUL L, ELFTEX415 (manufactured by Cabot Corporation); Nipex90, Nipex150T, Nipex160IQ, Nipex170IQ, Nipex75, Printex85, Printex95, Printex90, Printex35, and PrintexU (manufactured by Evonik Degussa GmbH). All of these examples are useful.

In one embodiment, a pigment other than cyan, magenta, yellow, and black may be used. Examples of the other pigment include C. I. Pigment Green 7, 10, and 36; C. I. Pigment Brown 3, 5, 25, and 26; C. I. Pigment Orange 2, 5, 7, 13, 14, 15, 16, 24, 34, 36, 38, 40, 43, 62, 63, 64, and 71.

The aqueous ink of the present invention may be prepared using at least a pigment, the above-described pigment dispersing resin and organic solvent, and water, and mixing them by a well-known method. According to one embodiment, a pigment dispersion obtained by mixing and dispersing a pigment, a pigment dispersing resin, and water is prepared, and subsequently, the pigment dispersion, an organic solvent, and water are mixed. The amount of water used herein is adjusted in such a manner that the total content of the organic solvent in the aqueous ink is within the desired range.

In another embodiment of the aqueous ink of the present invention, the ink may further contain, in addition to the above-described components, as necessary, a surfactant, a binder resin, and various additives. Specific embodiments are described below.

(Surfactant)

In one embodiment of the aqueous ink of the present invention, the ink may contain a polysiloxane-type surfactant for adjusting the surface tension to improve ejection stability. The surfactant is preferably at least one compound expressed by the general formulae (1) to (3), more preferably the compound represented by the general formula (1) or (2), and even more preferably the compound represented by the general formula (1). The loading of the surfactant is preferably from 0.1 to 5% by weight with reference to the total weight of the ink. The loading is more preferably from 0.5 to 3% by weight, even more preferably from 0.8% to 2% by weight, and most preferably from 1 to 1.5% by weight.

General formula (1)

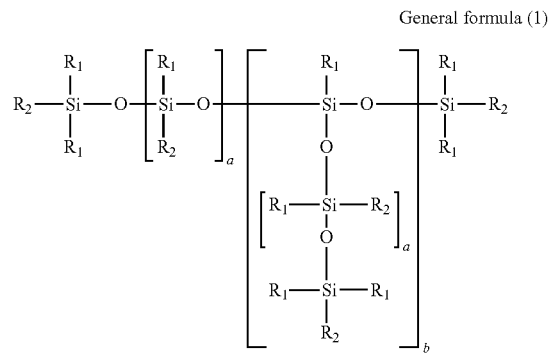

In the general formula (1), a is an integer of from 1 to 500; b is an integer of from 0 to 10; R1 represents an alkyl group or an aryl group; R2 is either substituent selected from the following (A), (B), (C), and (D), and at least one R2 contains the substituent of the following W.

Substituent (A)

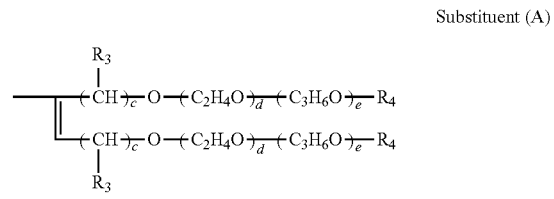

In the formula, c is an integer of from 1 to 20; d is an integer of from 0 to 50; e is an integer of from 0 to 50; R3 represents a hydrogen atom or an alkyl group; and R4 represents a hydrogen atom, an alkyl group, or an acyl group.

Substituent (B)

In the formula, if is an integer of from 2 to 20; R5 represents a hydrogen atom, an alkyl group, an acyl group, or an ether group having a dimethylpropyl skeleton.

Substituent (C)

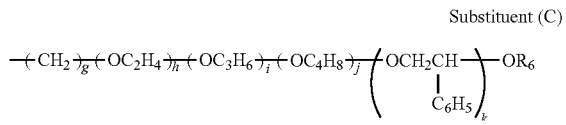

In the formula, g is an integer of from 2 to 6; h is an integer of from 0 to 20; i is an integer of from 1 to 50; j is an integer of from 0 to 10; and k is an integer of from 0 to 10. R6 represents a hydrogen atom, an alkyl group, or an acyl group.

Substituent (D)

Alkyl group or an aryl group.

The compound expressed by the general formula (1) is commercially available. Examples include Tegotwin4000 and Tegotwin4100 manufactured by Evonik Degussa GmbH.

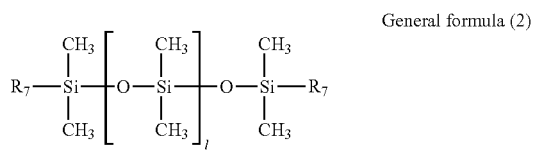

General formula (2)

In the formula, l represents an integer of 10 to 80. R7 represents the substituent of the following (E).

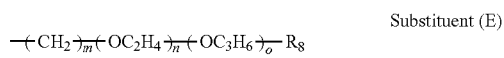

Substituent (E)

In the formula, m is an integer of from 1 to 6; n is an integer of from 0 to 50; o is an integer of from 0 to 50; n+o represents an integer of 1 or more; and R8 is a hydrogen atom, an alkyl group with a carbon atom number of 1 to 6, or a (meth)acryl group.

The compound represented by general formula (2) is commercially available. Examples include BY16-201 and SF8427 manufactured by Dow Corning Toray Co., Ltd.; BYK-331, BYK-333, and BYK-W3500 manufactured by BYK-Chemie; and Tegoglide410, Tegoglide432, Tegoglide435, Tegoglide440, and Tegoglide450 manufactured by Evonik Degussa GmbH.

General Formula (3)

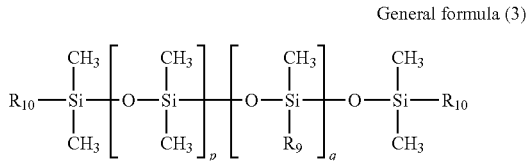

General formula (3)

In the formula, each of p and q is an integer of 1 or more; p+q represents an integer of from 3 to 50; R9 is represented by the substituent of the following (F); R10 represents an alkyl group with a carbon atom number of 1 to 6.

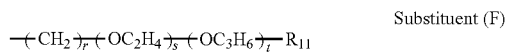

Substituent (F)

In the formula, r is an integer of from 1 to 6; s is an integer of from 0 to 50; t is an integer of from 0 to 50; s+t represents an integer of 1 or more; and R11 is a hydrogen atom, an alkyl group with a carbon atom number of 1 to 6, or a (meth)acryl group.

The compound expressed by the general formula (3) is commercially available. Examples include SF8428, FZ-2162, 8032ADDITIVE, SH3749, FZ-77, L-7001, L-7002, FZ-2104, FZ-2110, F-2123, SH8400, and SH3773M manufactured by Dow Corning Toray Co., Ltd.; BYK-345, BYK-346, BYK-347, BYK-348, and BYK-349 manufactured by BYK-Chemie; Tegowet250, Tegowet260, Tegowet270, and Tegowet280 manufactured by Evonik Degussa GmbH; and KF-351A, KF-352A, KF-353, KF-354L, KF355A, KF-615A, KF-640, KF-642, and KF-643 manufactured by Shin-Etsu Chemical Co., Ltd.

(Binder Resin)

In one embodiment of the aqueous ink of the present invention, a binder resin may be further added to the ink, thereby improving resistance of the printed material. Known binder resins for aqueous ink are broadly divided into water-soluble resins and resin fine particles. In general, the resin fine particles have higher molecular weight than the water-soluble resins, and thus achieve higher resistance. Meanwhile, the resin fine particles decrease the ink viscosity. The resin fine particles are suitable for increasing the ink resistance for inkjet, because they can be contained in the ink in a large quantity. Examples of the resin fine particles include acrylic resins, urethane resins, styrene butadiene resins, vinyl chloride resins, and polyolefin resins. In consideration of ink stability and resistance of the printed material, the use of the resin fine particles of acrylic resins is preferred.

Resistance such as abrasion resistance and chemical resistance is readily improved by increasing the glass transition point temperature (Tg) of the binder resin. Therefore, in one embodiment, the Tg of the binder resin is preferably from 50 to 120° C., and more preferably from 80 to 100° C. When the Tg is higher than 50° C., sufficient resistance is achieved, and falling of the ink coating film from the practical printed material is readily prevented. In addition, when Tg is lower than 120° C., the coating film is resistant to hardening, and problems such as fracture and cracking in the printed surface occurring during bending of the printed material are readily prevented.

The content of the binder resin in the ink is 2% or more and 30% or less by weight, preferably 3% or more and 20% or less by weight, and more preferably 6% or more and 15% or less by weight in terms of the solid content, with reference to the total weight of the ink.

(Other Additives)

In one embodiment of the aqueous ink of the present invention, in addition to the above-described components, various additives such as an anti-foaming agent, a thickener, a pH controlling agent, and an antiseptic may be added as necessary, thereby achieving desired physical property value. The loading of these various additives is 0.01% or more and 10% or less by weight, preferably 0.05% or more and 5% or less by weight, more preferably 0.1% or more and 3% or less by weight, with reference to the total weight of the ink.

<Ink Set>

The ink of the present invention may be used in a single color, or in the form of an ink set composed of multiple colors according to the intended use. The combination of the colors is not particularly limited, and one embodiment is an ink set containing three colors, cyan, magenta, and yellow. When the ink set is composed of these three colors, a full color image is obtained. In addition, blackness and visibility of characters are improved by adding a black ink to the ink set. Furthermore, color reproducibility can be improved by adding other color such as orange and green to the ink set. When a printing medium other than white is used for printing, the combination with a white ink makes it easy to obtain a sharp image.

When the ink of the present invention is used according to the embodiment of the ink set containing the combination of cyan, magenta, and yellow, preferred examples of the pigments are as follows.

Cyan pigments are C. I. Pigment Blue 15:3 and 15:4.

Magenta pigments are C. I. Pigment Red 122, 202, 209, 269, and C. I. Pigment Violet 19.

Yellow pigments are C. I. Pigment Yellow 74, 120, 150, 155, and 185.

According to one embodiment of the ink set, the pigments selected from the above examples are used in combination, whereby high color reproducibility is readily achieved.

<Printing Method>

A second aspect of the present invention relates to a printing method of the inkjet recording system using the aqueous ink for inkjet of the first aspect. The printing method includes a printing step wherein the droplets of the aqueous ink for inkjet are adhered to the printing medium. According to the present invention, a high quality printed material is obtained by directly printing on a printing medium, without forming a functional layer such as an ink-receiving layer on the printing medium before the printing step. According to one embodiment, the printing step is preferably carried out with the printing medium warmed to room temperature or higher. The warming is carried out preferably at 40 to 80° C., more preferably at 45 to 70° C., and even more preferably at 50 to 60° C. When the warming is carried out at a temperature of 40° C. or higher, the printed surface dries immediately after the ink drops of the aqueous ink are landed on the printing medium, so that the occurrence of bleeding between the ink colors is readily prevented. Furthermore, prevention of bleeding makes it easy to obtain a printed material with higher quality. In addition, warming at a temperature of 80° C. or lower also warms the inkjet head, which makes it easy to prevent the problem of ejection failure caused by drying of ink around the nozzles.

The printing medium is not particularly limited, and may be a typical printing medium known in the technical field. Examples of the printing medium include paper media such as fine paper, coated paper, art paper, cast paper, synthetic paper, and paper for inkjet. Other examples of the printing medium include plastic media such as polyvinyl chloride sheets, PET film, and PP film. The surface of these printing media may be smooth or asperity. In addition, the printing medium may be transparent, translucent, or opaque. Furthermore, the form of the printing medium is not particularly limited, and may be typically a sheet-like base material. In one embodiment, the printing medium may be used singly, or in the form of a laminate composed of two or more printing media. In another embodiment, the printing medium may have a functional layer such as an adhesive layer, whose surface is protected with a release sheet or the like, on the opposite side of the printed surface. Alternatively, after printing, the functional layer such as an adhesive layer may be formed on the printed surface of the printing medium.

According to one embodiment of the present invention, it is preferred that a printing medium having a 60° glossiness of 40 or more is used. A high-quality and glossy printed material is readily obtained by printing on a printing medium having a 60° glossiness of 40 or more. Examples of the printing medium with a 60° glossiness of 40 or more include coated paper media such as coated paper, art paper, and cast paper, and plastic media such as polyvinyl chloride sheets, PET film, and PP film. The term "60° glossiness" mentioned herein is the value obtained in accordance with the measuring method defined in "JIS Z 8741".

The examples of printing media such as coated paper and plastic media listed above have lower water absorbency than typical paper media. Therefore, when a conventional aqueous ink is used for printing on such a printing media with low water absorbency, image bleeding tends to occur. However, according to the present invention, image bleeding is prevented, so that high quality printed materials are readily obtained. More specifically, according to the present invention, an aqueous ink for inkjet which has superior printability to various printing media is provided, so that high quality printed materials are readily formed on various printing media, without limiting the type of the printing media.

EXAMPLES

The embodiments of the present invention are specifically described below based on examples and comparative examples. Unless otherwise noted, "part" and "%" means "part by mass" and "% by weight", respectively.

1. Preparation of Pigment Dispersing Resin (Pigment Dispersing Resin A)

93.4 parts of butanol are placed in a reaction vessel equipped with a gas inlet tube, a thermometer, a condenser, and a stirrer, and substituted with nitrogen gas. The inside of the reaction vessel was heated to 110° C., a mixture of 70 parts of 2-ethylhexyl methacrylate, 30 parts of acrylic acid, and 6 parts of V-601 (manufactured by Wako Pure Chemical Industries, Ltd., radical polymerization initiator) was dropped over a period of 2 hours, and polymerization reaction was carried out. After completion of dropping, the reaction was further proceeded at 110° C. for 3 hours, 0.6 parts of V-601 (manufactured by Wako Pure Chemical Industries, Ltd.) was added, the reaction further proceeded at 110° C. for 1 hour, and thus a solution of the pigment dispersing resin A was obtained. Furthermore, the solution was cooled to room temperature, 37.1 parts of dimethylaminoethanol was added for neutralization, and then 100 parts of water were added for making the solution water-based. Thereafter, the solution thus obtained was heated to 100° C. or higher, thereby evaporating butanol by boiling together with water, and adjusting the solid component content (solid content) in the solution to 50%. As a result, a water-based solution (solid content 50%) of the pigment dispersing resin A was obtained.

(Pigment Dispersing Resin B)

A water-based solution (solid content 50%) of the pigment dispersing resin B was obtained in the same manner as the resin synthesis in the operation for the pigment dispersing resin A, except that the 2-ethylhexyl methacrylate used for the pigment dispersing resin A was replaced by lauryl methacrylate.

(Pigment Dispersing Resin C)

A water-based solution (solid content 50%) of the pigment dispersing resin C was obtained in the same manner as the resin synthesis in the operation for the pigment dispersing resin A, except that 70 parts of the 2-ethylhexyl methacrylate used for the pigment dispersing resin A were replaced by 35 parts of lauryl methacrylate and 35 parts of styrene.

(Pigment Dispersing Resin D)

A water-based solution (solid content 50%) of the pigment dispersing resin D was obtained in the same manner as the resin synthesis in the operation for the pigment dispersing resin A, except that 70 parts of the 2-ethylhexyl methacrylate used for the pigment dispersing resin A were replaced by 35 parts of behenyl acrylate and 35 parts of styrene.

(Pigment Dispersing Resin E)

A water-based solution (solid content 50%) of the pigment dispersing resin E was obtained in the same manner as the resin synthesis in the operation for the pigment dispersing resin A, except that 70 parts of the 2-ethylhexyl methacrylate used for the pigment dispersing resin A were replaced by 70 parts of butyl methacrylate.
(Pigment Dispersing Resin F)

As a typical commercial pigment dispersing resin, "BYK190" (styrene maleic acid resin) manufactured by BYK-Chemie was provided.
(Pigment Dispersing Resin G)

As a typical commercial pigment dispersing resin, Joncryl 501" (styrene maleic acid resin) manufactured by BASF was provided.

Details about the pigment dispersing resins A to G are shown in Table 1.

TABLE 1

| Dispersing resin | resin constitution | | | | | | Solid content (%) | Acid value (mgKOH/g) |
|---|---|---|---|---|---|---|---|---|
| | 2EHMA | LMA | VA | BMA | AA | St | | |
| A | 70 | | | | 30 | | 50 | 234 |
| B | | 70 | | | 30 | | 50 | 234 |
| C | | 35 | | | 30 | 35 | 50 | 234 |
| D | | | 35 | | 30 | 35 | 50 | 234 |
| E | | | | 70 | 30 | | 50 | 234 |
| F | "BYK190" manufactured by BYK-Chemie | | | | | | 40 | 10 |
| G | "Joncryl 501" manufactured by BASF | | | | | | 29.5 | 205 |

The abbreviations listed in Table 1 are as described below.
2EHMA: 2-ethylhexyl methacrylate
LMA: lauryl methacrylate
VA: behenyl acrylate
BMA: butyl methacrylate
AA: acrylic acid
St: styrene 2. Preparation of Pigment Dispersion (Pigment Dispersion A)

20 parts of pigment blue 15:3 as a pigment, 12 parts of a water-based solution of the pigment dispersing resin A, and 68 parts of water were mixed, and preliminarily dispersed with a disperser. Subsequently, main dispersion was carried out over a period of 2 hours using a 0.6-L DYNO mill filled with 1,800 g of zirconia beads having a diameter of 0.5 mm, thereby obtaining a pigment dispersion A (Cyan).

A pigment dispersion A (Magenta) was obtained in the same manner as the above operation, except that pigment blue 15:3 was replaced by pigment red 122.

A pigment dispersion A (Yellow) was obtained in the same manner as the above operation, except that pigment blue 15:3 was replaced by pigment yellow 120.

A pigment dispersion A (Black) was obtained in the same manner as the above operation, except that pigment blue 15:3 was replaced by pigment black 7.
(Pigment Dispersions B to G)

Pigment dispersions B to G were obtained in the same manner as the pigment dispersion in the operation for the pigment dispersion A, except that the pigment dispersing resins B to G were individually used as a pigment dispersing resin. The loadings of the pigment dispersion F and G were adjusted in consideration that the solid content of the pigment dispersing resin aqueous solution is different from that of the pigment dispersion A. The specific recipes for the pigment dispersions A to G are shown in Table 2. According to the recipes for the pigment dispersions A to G shown in Table 2, the solid content of the pigment dispersing resin is 6 parts by weight with reference to 100 parts of the total weight of the dispersion.

TABLE 2

| Dispersion | Pigment | Dispersing resin | | Water |
|---|---|---|---|---|
| | | Type | Amount | |
| A | 20 | Dispersing resin A | 12 | 68 |
| B | 20 | Dispersing resin B | 12 | 68 |
| C | 20 | Dispersing resin C | 12 | 68 |
| D | 20 | Dispersing resin D | 12 | 68 |
| E | 20 | Dispersing resin E | 12 | 68 |

TABLE 2-continued

| Dispersion | Pigment | Dispersing resin | | Water |
|---|---|---|---|---|
| | | Type | Amount | |
| F | 20 | Dispersing resin F | 15 | 65 |
| G | 20 | Dispersing resin G | 20.3 | 59.7 |

3. Aqueous Ink

Example 1

20 parts of the pigment dispersion A (Cyan), 10 parts of diethylene glycol methyl ethyl ether, 10 parts of 1,2-hexanediol, and 60 parts of water were charged in this order into a mixing vessel under stirring with a disperser, and stirred thoroughly until uniform. Subsequently, the mixture was filtered through a membrane filter to remove coarse particles which can cause head clogging, thereby making a cyan ink for inkjet of the present invention. In the same manner, using the three pigment dispersions A (Magenta, Yellow, and Black) prepared above, magenta, yellow, and black inks were prepared. These inks for inkjet thus prepared were charged into VersaCAMM VS-540 (inkjet printer manufactured by Roland DG Corporation), and printed on a printing medium. This printing step was carried out using a polyvinyl chloride sheet as the printing medium, with the sheet warmed to 45° C. The 60° glossiness of the sheet was (88). With regard to the obtained printed material, evaluations of various properties were performed as the following. The evaluation results are shown in Table 3.
(Evaluation of Drying Characteristics)

Solid printing with a printing rate of 100% was carried out using the above-described printer under different numbers of printing paths. The occurrence of mottling on each printed material was observed, and the drying characteristics were evaluated. The evaluation criteria are as follows.

5: No mottling occurs when printing is carried out as the number of print passes is 4.

4: No mottling occurs when printing is carried out as the number of print passes is 8.

3: No mottling occurs when printing is carried out as the number of print passes is 16.

2: No mottling occurs when printing is carried out as the number of print passes is 32.

1: Mottling occurs even when printing is carried out as the number of print passes is 32.

(Evaluation of Printing Quality)

Printing was carried out using the above-described printer, in such a manner that the borders of the monochrome solid printed areas (cyan, magenta, yellow, and black) (printing rate: 100%) and the solid printed areas of the secondary colors (red, green, and blue) (printing rate: 200%) are in contact with each other. The bleeding at the borders of the printed material, and white voids in the solid printed area were observed, whereby the printing quality was evaluated. The evaluation criteria are as follows.

5: No bleeding is observed at the border between the secondary colors, and no white void is observed in the monochrome solid printed area.

4: No bleeding is observed at the border between the secondary color and monochrome, and no white void is observed in the monochrome solid printed area.

3: No bleeding is observed at the border between the monochromes, and no white void is observed in the monochrome solid printed area.

2: Slight bleeding is observed at the border between the monochromes, or slight white void is observed in the monochrome solid printed area.

1: Superior bleeding is observed at the border between the monochromes, or many white voids are observed in the monochrome solid printed area.

(Evaluation of Glossiness)

The 60° glossiness of the printed materials having no mottling in the above-described evaluation of drying characteristics was measured. The evaluation criteria are as follows:

5: glossiness is 70 or more;
4: glossiness is 50 or more and less than 70;
3: glossiness is 30 or more and less than 50;
2: glossiness is 10 or more and less than 30; and
1: glossiness is less than 10.

Examples 2 to 24, Comparative Examples 1 to 14

Inks were prepared in the same manner as in Example 1 using the materials listed in Tables 3 and 4, and then used for printing. The various properties of the printed materials thus obtained were evaluated in the same manner as in Example 1. The evaluation results are shown in Tables 3 and 4.

TABEL 3

| | Dispersion | | | | | | | Self dispersion | Solvent A | | | | Solvent B | | |
|---|---|---|---|---|---|---|---|---|---|---|---|---|---|---|---|
| | A | B | C | D | E | F | G | | MEDG | MP | MMB | PNP | HexD | BDG | DPNP |
| Example 1 | 20 | | | | | | | | 10 | | | | 10 | | |
| Example 2 | 20 | | | | | | | | | 10 | | | 10 | | |
| Example 3 | 20 | | | | | | | | | | 10 | | 10 | | |
| Example 4 | 20 | | | | | | | | | | | 10 | 10 | | |
| Example 5 | 20 | | | | | | | | | 10 | | | | 10 | |
| Example 6 | 20 | | | | | | | | | 10 | | | | | 10 |
| Example 7 | 20 | | | | | | | | | 5 | | | 5 | | |
| Example 8 | 20 | | | | | | | | | 7.5 | | | 7.5 | | |
| Example 9 | 20 | | | | | | | | | 15 | | | 15 | | |
| Example 10 | 20 | | | | | | | | | 20 | | | 20 | | |
| Example 11 | 20 | | | | | | | | | 5 | | | 15 | | |
| Example 12 | 20 | | | | | | | | | 15 | | | 5 | | |
| Example 13 | | 20 | | | | | | | | 5 | | | 15 | | |
| Example 14 | | 20 | | | | | | | | 10 | | | 10 | | |
| Example 15 | | 20 | | | | | | | | 15 | | | 5 | | |
| Example 16 | | | 20 | | | | | | | 5 | | | 15 | | |
| Example 17 | | | 20 | | | | | | | 10 | | | 10 | | |
| Example 18 | | | 20 | | | | | | | 15 | | | 5 | | |
| Example 19 | | | | 20 | | | | | | 5 | | | 15 | | |
| Example 20 | | | | 20 | | | | | | 10 | | | 10 | | |
| Example 21 | | | | 20 | | | | | | 15 | | | 5 | | |
| Example 22 | | | 20 | | | | | | | 10 | | | 10 | | |
| Example 23 | | | 20 | | | | | | | 10 | | | 10 | | |
| Example 24 | | | 20 | | | | | | | 10 | | | 10 | | |

| | | | | Evaluation | | |
|---|---|---|---|---|---|---|
| | Surfactant | Resin | Water | Drying characteristics | Printing quality | Glossiness |
| Example 1 | | | 60 | 4 | 3 | 4 |
| Example 2 | | | 60 | 5 | 4 | 4 |
| Example 3 | | | 60 | 5 | 4 | 4 |
| Example 4 | | | 60 | 4 | 3 | 4 |
| Example 5 | | | 60 | 5 | 3 | 3 |
| Example 6 | | | 60 | 5 | 3 | 3 |
| Example 7 | | | 70 | 4 | 3 | 4 |
| Example 8 | | | 65 | 5 | 4 | 4 |
| Example 9 | | | 50 | 5 | 4 | 4 |
| Example 10 | | | 40 | 3 | 4 | 4 |
| Example 11 | | | 60 | 3 | 4 | 4 |

TABEL 3-continued

| | Surfactant | Resin | Water | Drying characteristics | Printing quality | Glossiness |
|---|---|---|---|---|---|---|
| Example 12 | | | 60 | 5 | 4 | 3 |
| Example 13 | | | 60 | 3 | 5 | 4 |
| Example 14 | | | 60 | 5 | 5 | 4 |
| Example 15 | | | 60 | 5 | 5 | 3 |
| Example 16 | | | 60 | 3 | 5 | 5 |
| Example 17 | | | 60 | 5 | 5 | 5 |
| Example 18 | | | 60 | 5 | 5 | 4 |
| Example 19 | | | 60 | 3 | 5 | 5 |
| Example 20 | | | 60 | 5 | 5 | 5 |
| Example 21 | | | 60 | 5 | 5 | 4 |
| Example 22 | 0.2 | | 59.8 | 5 | 5 | 5 |
| Example 23 | 1 | | 59 | 5 | 5 | 5 |
| Example 24 | 1 | 20 | 39 | 5 | 5 | 5 |

TABLE 4

| | Dispersion | | | | | | | Self dispersion | Solvent A | | | | Solvent B | | |
|---|---|---|---|---|---|---|---|---|---|---|---|---|---|---|---|
| | A | B | C | D | E | F | G | | MEDG | MP | MMB | PNP | HexD | BDG | DPNP |
| Comparative Example 1 | | | | | | | | 20 | 10 | | | | 10 | | |
| Comparative Example 2 | | | | | | | | 20 | | 10 | | | 10 | | |
| Comparative Example 3 | 20 | | | | | | | | | 20 | | | | | |
| Comparative Example 4 | 20 | | | | | | | | 10 | 10 | | | | | |
| Comparative Example 5 | 20 | | | | | | | | | | | | 20 | | |
| Comparative Example 6 | 20 | | | | | | | | | | | | 10 | 10 | |
| Comparative Example 7 | | | | 20 | | | | | | 10 | | | 10 | | |
| Comparative Example 8 | | | | | 20 | | | | | 10 | | | 10 | | |
| Comparative Example 9 | | | | | | 20 | | | | 10 | | | 10 | | |
| Comparative Example 10 | 20 | | | | | | | | | 3 | | | 3 | | |
| Comparative Example 11 | 20 | | | | | | | | | 30 | | | 30 | | |
| Comparative Example 12 | | 20 | | | | | | | | | | | 10 | 10 | |
| Comparative Example 13 | | | 20 | | | | | | | | | | 10 | 10 | |
| Comparative Example 14 | | | | 20 | | | | | | | | | 10 | 10 | |

| | | | | Evaluation | | |
|---|---|---|---|---|---|---|
| | Surfactant | Resin | Water | Drying characteristics | Printing quality | Glossiness |
| Comparative Example 1 | | | 60 | 4 | 1 | 1 |
| Comparative Example 2 | | | 60 | 5 | 2 | 1 |
| Comparative Example 3 | | | 60 | 5 | 1 | 2 |
| Comparative Example 4 | | | 60 | 5 | 1 | 1 |
| Comparative Example 5 | | | 60 | 1 | 2 | 3 |
| Comparative Example 6 | | | 60 | 1 | 2 | 3 |
| Comparative Example 7 | | | 60 | 5 | 4 | 2 |
| Comparative Example 8 | | | 60 | 4 | 1 | 1 |
| Comparative Example 9 | | | 60 | 5 | 2 | 2 |
| Comparative Example 10 | | | 74 | 3 | 3 | 3 |

TABLE 4-continued

| | | | | |
|---|---|---|---|---|
| Comparative Example 11 | 20 | 3 | 3 | 4 |
| Comparative Example 12 | 60 | 1 | 2 | 3 |
| Comparative Example 13 | 60 | 1 | 2 | 4 |
| Comparative Example 14 | 60 | 2 | 3 | 4 |

Details about the components shown in Tables 3 and 4 are as follows.

Self-dispersive solution: CAB-O-JET series (manufactured by Cabot Corporation, anionic self-dispersive cyan, magenta, yellow and black pigment dispersions)

MEDG: diethylene glycol methyl ethyl ether
MP: propylene glycol monomethyl ether
MMB: 3-methyl-3-methoxybutanol
PNP: propylene glycol monopropyl ether
HexD: 1,2-hexanediol
BDG: diethylene glycol monobutyl ether
DPNP: dipropylene glycol monopropyl ether
Surfactant: TegoGlide 440 (manufactured by Evonik Degussa GmbH)
Resin: binder resin of acryl emulsion (Tg 80° C., Nv. 40%)

The results shown in Tables 3 and 4 indicate that the inks of Examples have better drying characteristics and offer higher printing quality and glossiness of the printed materials than those of Comparative Examples 1 to 14. In particular, the evaluation of printing quality tends to be higher when MP or MMB is used as the solvent A. In addition, the evaluation of glossiness tends to be higher when alkanediol is used as the solvent B. In addition, printing quality tends to be improved by the increase of the carbon atom number of the alkyl groups in the pigment dispersing resin, and glossiness tends to be improved by the introduction of styrene. For Examples 22 to 24, high evaluations were achieved for all properties, and the improvement of the ejection stability (Examples 22 and 23), and improvement of resistance of the printed material (Example 24) were also confirmed.

In contrast, the inks of Comparative Examples 1 to 14 showed evident property deterioration. For example, in Comparative Examples 1 and 2, the pigment dispersion was replaced by a self-dispersive pigment dispersion, so that pigment flocculation occurred during ink drying. Therefore, the ink did not spread, and the printed material had poor printing quality and low glossiness. In addition, Comparative Examples 3 and 4 contained no solvent B, so that the ink dried without spreading on the printing medium, and white voids occurred. Comparative Examples 5 and 6 contained no solvent A, so that the drying speed was low, and bleeding occurred at the border between the colors.

4. Printing Method

The influence of the warming temperature on the printing medium during printing was studied using the inks prepared in Examples 2, 14, and 17. Printing was carried out in the same manner as in the above-described example, except for that the warming during printing was changed, and the various properties of the printed materials thus obtained were evaluated. The results are shown in Table 5.

TABLE 5

| | | Evaluation | | |
|---|---|---|---|---|
| Ink | Temperature (° C.) | Drying properties | Printing quality | Glossiness |
| Example 2 | 25 | 3 | 3 | 5 |
| | 35 | 4 | 4 | 5 |
| | 45 | 5 | 4 | 4 |
| | 55 | 5 | 5 | 4 |
| | 65 | 5 | 4 | 4 |
| | 85 | 5 | 3 | 3 |
| Example 14 | 25 | 3 | 4 | 5 |
| | 35 | 4 | 4 | 5 |
| | 45 | 5 | 5 | 4 |
| | 55 | 5 | 5 | 4 |
| | 65 | 5 | 4 | 4 |
| | 85 | 5 | 4 | 3 |
| Example 17 | 25 | 4 | 4 | 5 |
| | 35 | 5 | 4 | 5 |
| | 45 | 5 | 5 | 5 |
| | 55 | 5 | 5 | 5 |
| | 65 | 5 | 5 | 5 |
| | 85 | 5 | 4 | 4 |

The results shown in Table 5 indicate that drying characteristics of the printed material is readily improved by warming, in comparison with the case wherein the printing step is carried out at room temperature (25° C.) without warming of the printing medium. In addition, the appropriate adjustment of the warming temperature improves drying characteristics, and facilitates the improvement of printing properties such as printing quality and glossiness of the printed material.

The invention claimed is:

1. An aqueous ink for inkjet, comprising a pigment, a pigment dispersing resin, an organic solvent, and water, wherein:
    the organic solvent comprises:
        (A) a water-soluble organic solvent having a boiling point of 100° C. or higher and 180° C. or lower, and
        (B) an organic solvent having a boiling point of 200° C. or higher and 280° C. or lower, and having a surface tension of 20 mN/m or more and 30 mN/m or less;
    the pigment dispersing resin has an alkyl group with a carbon atom number of 8 or more;
    an acid value of the pigment dispersing resin is from 150 to 400 mgKOH/g; and
    a weight ratio of water-soluble organic solvent (A) and organic solvent (B) is (A):(B)=1:4 to 4:1.

2. The aqueous ink for inkjet according to claim 1, wherein the total content of the water-soluble organic solvent (A) and the organic solvent (B) is from 10 to 45% by weight with reference to the total weight of the ink.

3. The aqueous ink for inkjet according to claim 1, wherein the pigment dispersing resin comprises an acrylic resin having an alkyl chain with a carbon atom number of 10 or more.

4. The aqueous ink for inkjet according to claim 1, wherein the water-soluble organic solvent (A) comprises at least one selected from the group consisting of propylene glycol monomethyl ether, methoxybutanol, and 3-methyl-3-methoxybutanol.

5. The aqueous ink for inkjet according to claim 1, wherein the organic solvent (B) comprises an alkanediol-type solvent.

6. The aqueous ink for inkjet according to claim 1, further comprising a surfactant, wherein the surfactant comprises a polysiloxane-type surfactant.

7. An inkjet printing method, comprising attaching droplets of the aqueous ink for inkjet according to claim 1 to a printing medium under warming.

8. The printing method according to claim 7, wherein a 60° glossiness of the printing medium is 40 or more.

9. The aqueous ink for inkjet according to claim 1, wherein the water-soluble organic solvent (A) comprises at least one selected from the group consisting of propylene glycol monomethyl ether, methoxybutanol, and 3-methyl-3-methoxybutanol; and
the organic solvent (B) comprises an alkanediol-type solvent.

10. The aqueous ink for inkjet according to claim 1, wherein the pigment dispersing resin comprises a copolymer obtained by polymerizing (i) (meth)acrylic acid, (ii) a (meth)acrylate having an alkyl group with a carbon atom number of 8 or more, and optionally (iii) a polymerizable monomer compound having an aromatic group.

11. The aqueous ink for inkjet according to claim 10, wherein the contents of the monomer components composing the copolymer are: (i) from 10 to 50% by weight, (ii) from 10 to 70% by weight, and (iii) from 0 to 50% by weight, with reference to the total weight of all the monomer components.

12. The aqueous ink for inkjet according to claim 10, wherein the copolymer is obtained by polymerizing said (meth)acrylic acid, said (meth)acrylate having an alkyl group with a carbon atom number of 8 or more, and said polymerizable monomer compound having an aromatic group, and wherein the contents of the monomer components composing the copolymer are: (i) from 20 to 40% by weight, (ii) from 20 to 50% by weight, and (iii) from 10 to 40% by weight, with reference to the total weight of all the monomer components.

13. The aqueous ink for inkjet according to claim 1, wherein the alkyl group with a carbon atom number of 8 or more is a linear alkyl group.

14. The aqueous ink for inkjet according to claim 1, wherein the alkyl group with a carbon atom number of 8 or more is a linear alkyl group with a carbon atom number of 10 or more.

15. The aqueous ink for inkjet according to claim 1, wherein the alkyl group with a carbon atom number of 8 or more is a linear alkyl group with a carbon atom number of 12 to 30.

16. The aqueous ink for inkjet according to claim 1, wherein the alkyl group with a carbon atom number of 8 or more is a linear alkyl group with a carbon atom number of 18 to 24.

17. The aqueous ink for inkjet according to claim 11, wherein the alkyl group with a carbon atom number of 8 or more is a linear alkyl group with a carbon atom number of 12 to 30.

18. The aqueous ink for inkjet according to claim 12, wherein the alkyl group with a carbon atom number of 8 or more is a linear alkyl group with a carbon atom number of 12 to 30.

19. The aqueous ink for inkjet according to claim 1, wherein the weight ratio of water-soluble organic solvent (A) and organic solvent (B) is (A):(B)=1:3 to 2:1.

20. The aqueous ink for inkjet according to claim 1, wherein the weight ratio of water-soluble organic solvent (A) and organic solvent (B) is (A):(B)=1:2 to 2:1.

21. An aqueous ink for inkjet, comprising a pigment, a pigment dispersing resin, an organic solvent, and water, wherein:
the organic solvent comprises:
(A) a water-soluble organic solvent having a boiling point of 100° C. or higher and 180° C. or lower, wherein the water-soluble organic solvent (A) comprises at least one selected from the group consisting of propylene glycol monomethyl ether, methoxybutanol, and 3-methyl-3-methoxybutanol, and
(B) an organic solvent having a boiling point of 200° C. or higher and 280° C. or lower, and having a surface tension of 20 mN/m or more and 30 mN/m or less, wherein the organic solvent (B) comprises an alkanediol-type solvent;
the pigment dispersing resin has an alkyl group with a carbon atom number of 8 or more;
an acid value of the pigment dispersing resin is from 150 to 400 mgKOH/g; and
a weight ratio of water-soluble organic solvent (A) and organic solvent (B) is (A):(B)=1:4 to 4:1.

22. The aqueous ink for inkjet according to claim 21, wherein the pigment dispersing resin further comprises an aromatic group.

23. The aqueous ink for inkjet according to claim 1, wherein the organic solvent (B) comprises at least one of alkanediol-type solvent selected form the group consisting of 1,2-pentanediol, 1,2-hexanediol, and 1,2-octanediol.

24. The aqueous ink for inkjet according to claim 1, wherein the water-soluble organic solvent (A) comprises at least one selected from the group consisting of propylene glycol monomethyl ether, propylene glycol monoethyl ether, propylene glycol monopropyl ether, methoxybutanol, and 3-methyl-3-methoxybutanol.

25. An aqueous ink for inkjet, comprising a pigment, a pigment dispersing resin, an organic solvent, and water, wherein:
the organic solvent comprises
(A) a water-soluble organic solvent having a boiling point of 100° C. or higher and 180° C. or lower, wherein the water-soluble organic solvent (A) comprises at least one selected from the group consisting of propylene glycol monomethyl ether, propylene glycol monoethyl ether, propylene glycol monopropyl ether, methoxybutanol, and 3-methyl-3-methoxybutanol and
(B) an organic solvent having a boiling point of 200° C. or higher and 280° C. or lower, and having a surface tension of 20 mN/m or more and 30 mN/m or less, wherein the organic solvent (B) comprises an alkanediol-type solvent;
the pigment dispersing resin has an alkyl group with a carbon atom number of 8 or more; and an acid value of the pigment dispersing resin is from 150 to 400 mgKOH/g; and wherein a weight ratio of the water-soluble organic solvent (A) and the organic solvent (B) is (A):(B)=1:4 to 4:1.

* * * * *